(12) United States Patent
Tatarchuk et al.

(10) Patent No.: US 9,935,563 B2
(45) Date of Patent: Apr. 3, 2018

(54) ELECTRICAL ENERGY GENERATION WITHIN A VEHICLE TIRE

(71) Applicant: FREESCALE SEMICONDUCTOR, INC., Austin, TX (US)

(72) Inventors: John J. Tatarchuk, Chandler, AZ (US); Matthew W. Muddiman, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 413 days.

(21) Appl. No.: 14/818,449

(22) Filed: Aug. 5, 2015

(65) Prior Publication Data

US 2017/0040911 A1 Feb. 9, 2017

(51) Int. Cl.
| | |
|---|---|
| H01L 41/113 | (2006.01) |
| H02N 2/18 | (2006.01) |
| H01L 41/18 | (2006.01) |
| H02K 11/00 | (2016.01) |
| B60C 23/04 | (2006.01) |

(52) U.S. Cl.
CPC ........... *H02N 2/18* (2013.01); *B60C 23/0411* (2013.01); *H01L 41/18* (2013.01); *H02K 11/0094* (2013.01)

(58) Field of Classification Search
CPC .......... F03G 7/08; H02K 35/00; H02K 35/02; H02K 35/04; H02K 35/06; H02N 2/18; H02N 2/183; H02N 2/186; H01L 41/1136
USPC .......................................... 310/339; 290/1 R
See application file for complete search history.

(56) References Cited

U.S. PATENT DOCUMENTS

| | | | |
|---|---|---|---|
| 4,117,452 A | 9/1978 | Snyder et al. | |
| 4,405,872 A | 9/1983 | Thomas | |
| 4,504,761 A | 3/1985 | Triplett | |
| 4,554,527 A | 11/1985 | Muller | |
| 7,415,874 B2 | 8/2008 | Mancosu et al. | |
| 7,523,656 B1 | 4/2009 | Blixhavn et al. | |
| 8,330,331 B2 | 12/2012 | Horiguchi | |
| 8,578,767 B2 | 11/2013 | Dussinger et al. | |
| 2004/0078662 A1* | 4/2004 | Hamel ................ B60C 23/0411 714/22 |
| 2008/0140278 A1* | 6/2008 | Breed .................... G07C 5/008 701/31.4 |
| 2010/0186493 A1* | 7/2010 | Brusarosco ......... H01L 41/1132 73/146.3 |

(Continued)

OTHER PUBLICATIONS

Extended European Search Report for Patent Appln. No. 16182649.0 (Dec. 9, 2016) 7 pages.

(Continued)

*Primary Examiner* — Thomas Dougherty
(74) *Attorney, Agent, or Firm* — Charlene R. Jacobsen

(57) ABSTRACT

An apparatus for installation within a tire for a vehicle includes a flexible arm and a power generating element coupled to the flexible arm for generating electrical energy. One end of the flexible arm is coupled to a rim of the tire. The opposing end of the flexible arm is configured to be in contact with the inside tread surface of the tire. The flexible arm is capable of deformation in response to a variability of distance between the rim and the inside tread surface during rolling movement of the tire, and the power generating element generates the electrical energy in response to deformation of the flexible arm. The apparatus may be combined with a tire pressure sensor module as a system so as to provide electrical energy for powering the tire pressure sensor module.

20 Claims, 8 Drawing Sheets

(56) References Cited

U.S. PATENT DOCUMENTS

2010/0295655 A1    11/2010   Pannek
2012/0043856 A1     2/2012   Kameda et al.
2012/0240672 A1*   9/2012   Frey ..................... H01L 41/053
                                                               73/146.5

OTHER PUBLICATIONS

Lee et al, "Development of a piezoelectric energy harvesting system for implementing wireless sensors on the tires", Energy Conversion and Management 78, Feb. 2014, pp. 32-38.
Makki et al, "Battery-and wire-less tire pressure measurement systems (TPMS) sensor", Microsystem Technologies 18, Mar. 30, 2012, pp. 1201-1212.

* cited by examiner

ELECTRICAL ENERGY GENERATION WITHIN A VEHICLE TIRE

TECHNICAL FIELD OF THE INVENTION

The present invention relates generally to electrical energy generation within a vehicle tire. More specifically, the present invention relates to electrical energy generation in response to the variability of distance between the rim and inside tread surface of a rolling tire.

BACKGROUND OF THE INVENTION

Electronic devices are increasingly being incorporated within vehicular tires. These electronic devices may include sensors and other components suitable for obtaining information regarding various physical parameters of the tire, such as tire pressure, tire temperature, number of tire revolutions, vehicle speed, and the like. Such information can be useful in tire monitoring and/or warning systems. Indeed, tire pressure monitoring systems (TPMSs) are commonly utilized for monitoring the tire pressure of a motorized vehicle. Typically, the tire performance information is transmitted to a vehicle-side transceiver of the motorized vehicle. Thus, electronic devices located at the wheel can include wireless transmission circuitry. Furthermore, a microprocessor may be employed in order to collect and process the signals coming from the sensors before transmission.

Such integrated tire electronics modules must be supplied with electric power for operating their sensor elements, for processing the sensor signals, and for transmitting the signals to a vehicle-side transceiver. Thus, such electronics modules are typically powered by a non-rechargeable battery located within the tire electronics. Unfortunately, the service life of the battery within an integrated tire electronics module is limited. For example, a battery for an integrated tire electronics module may last approximately six to ten years. However, a tire may have a lifetime of approximately five years, while a car may have a lifetime of ten years or more. Thus, the batteries or the entire module will likely need replacement during the lifetime of the vehicle. For example, the batteries or the entire module for each tire may need replacement shortly after replacing the tires, which is both inconvenient and expensive. Alternatively, as a preventative maintenance measure, operable integrated tire electronics modules with significant remaining battery life may be discarded and replaced at the same time as the tire, which is both wasteful and costly. Further, some drivers will ignore dashboard warning lights indicating that the batteries need replacement in order to avoid paying repair costs, thereby decreasing their safety.

Accordingly, eliminating the battery as the energy source for integrated tire electronics or at least extending the service life of the battery is desirable from a cost, reliability, safety, and environmental perspective.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a power generation apparatus, a system located inside a tire of a vehicle that includes the power generation apparatus, and a method for generating electrical energy within a tire of a vehicle. More particularly, the power generation apparatus may be located on the rim upon which a tire is mounted for providing electrical energy to integrated tire electronics, such as a tire pressure sensor module or an intelligent tire pressure sensor module. The power generation apparatus uses a variability of distance between the rim and an inside tread surface of the tire as the tire rotates to generate electrical energy. The power generation apparatus fully decouples the tire pressure sensor module from the service life of the tire, may allow for the elimination or minimization of the onboard battery for the tire pressure sensor module, and may indefinitely extend the lifetime of the tire pressure sensor module. Furthermore, the power generation apparatus may generate more electrical energy than required for current tire pressure sensor modules, thereby reducing the need for stringent low-power requirements in such devices. Additionally, the power generation apparatus may be utilized to switch from a sleep/park mode of operation to a motion/sense mode of operation, thereby reducing or eliminating the need for providing a motion detection sensor (e.g., accelerometer) within the tire pressure sensor module.

The instant disclosure is provided to explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. It should be understood that the use of relational terms, if any, such as first and second, top and bottom, and the like are used solely to distinguish one from another entity or action without necessarily requiring or implying any actual such relationship or order between such entities or actions. The invention is defined solely by the appended claims including any amendments made during the pendency of this application and all equivalents of those claims as issued.

Figure 1:
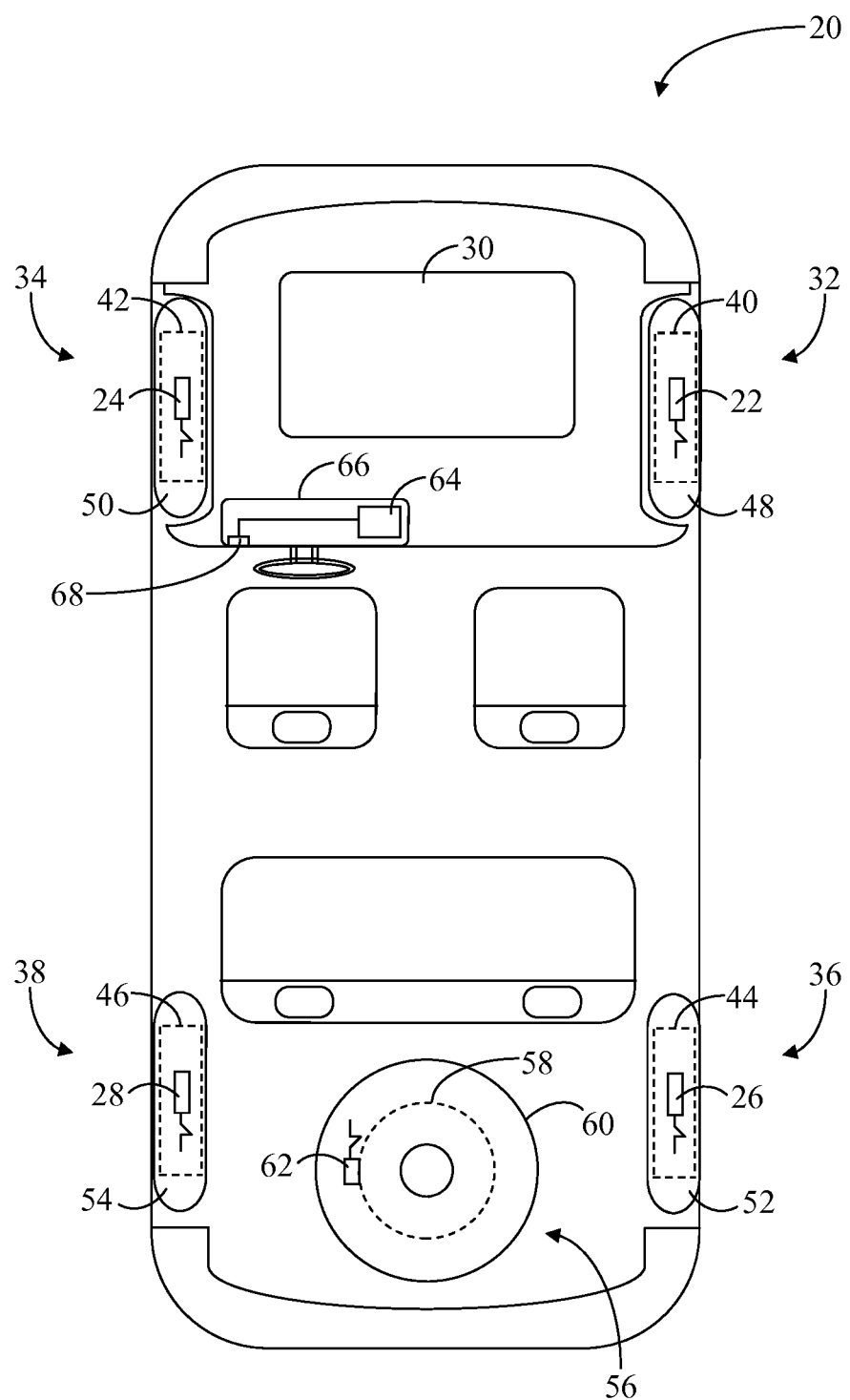
FIG. 1 shows a top view of a motorized vehicle that implements integrated tire electronics systems in accordance with an embodiment.

Referring to FIG. 1, FIG. 1 shows a top view of a motorized vehicle 20 that implements integrated tire electronics systems 22, 24, 26, 28 in accordance with an embodiment. In the embodiment shown, motorized vehicle 20 is a car with a motor 30. However, vehicle 20 may be any type of motorized vehicle, such as a truck, semitrailer, sport utility vehicle, motorcycle, bus, electric vehicle, airplane, and the like.

Vehicle 20 is supported by four wheels 32, 34, 36, 38. Each wheel 32, 34, 36, 38 includes a rim 40, 42, 44, 46 upon which a tire 48, 50, 52, 54 is mounted. Vehicle 20 also includes a spare wheel 56 with a rim 58 and a tire 60. Each of wheels 32, 34, 36, 38 includes its corresponding integrated tire electronics system 22, 24, 26, 28. Similarly, wheel 56 can include an integrated tire electronics system 62. In the illustrated embodiment, each of integrated tire electronics systems 22, 24, 26, 28, 62 is mounted to a portion of the rim 40, 42, 44, 46, 58 of its wheel 32, 34, 36, 38, 56 that is exposed to the internal pressurized side of the corresponding tire 48, 50, 52, 54, 60.

Each integrated tire electronics system 22, 24, 26, 28, 62 includes an antenna for transmitting information pertaining to the corresponding tire 48, 50, 52, 54, 60 to a central controller system 64 mounted in an instrument panel 66. Controller system 64 evaluates the received information and suitably informs a driver of any anomalies by activating an indicator (e.g., a display 68 or a dashboard light) in instrument panel 66. Collectively, integrated tire electronics systems 22, 24, 26, 28, 62 and the vehicle-side controller system 64 and display 68 form a tire pressure monitoring system (TPMS) for vehicle 20.

Figure 2:
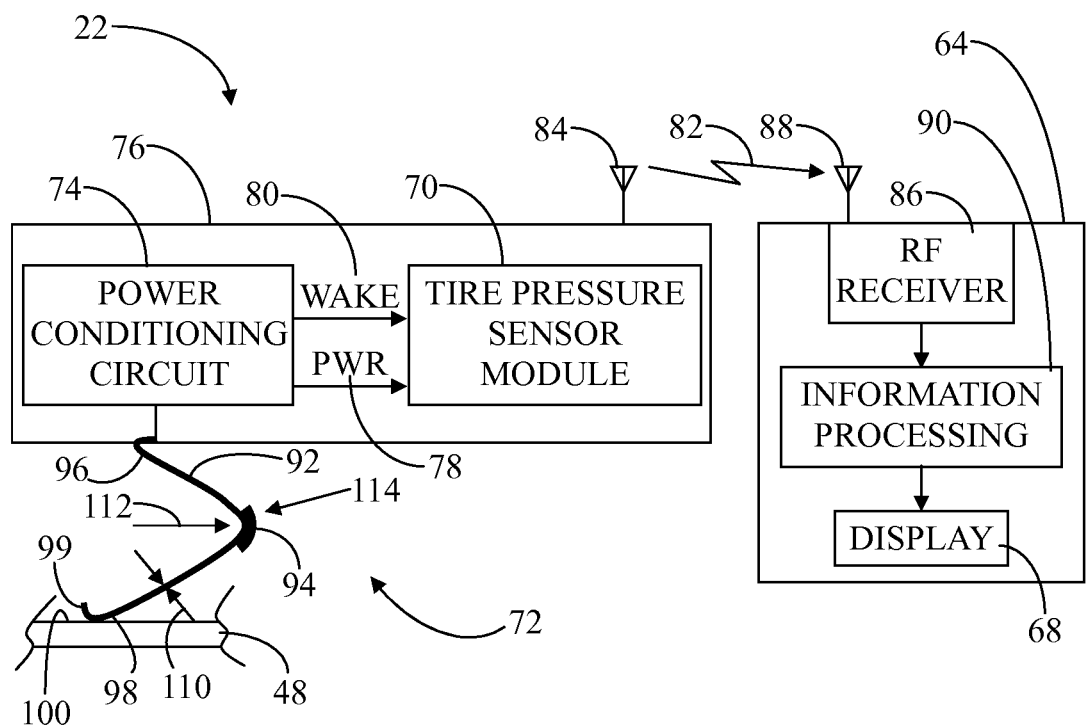
FIG. 2 shows a simplified block diagram of an integrated tire electronics system that includes a tire pressure sensor module and a power generation apparatus in accordance with the present invention.

FIG. 2 shows a simplified block diagram of integrated tire electronics system 22 that includes a tire pressure sensor module 70 and a power generation apparatus 72 in accordance with an embodiment. Tire pressure sensor module 70 and power conditioning circuitry 74 of power generation apparatus 72 may be enclosed in a protective housing 76 that is mounted onto rim 40 (FIG. 1) of wheel 32 (FIG. 1). Thus, integrated tire electronics system 22 is contained within the pressurized environment of tire 48. The following discussion presented in connection with FIG. 2 and the ensuing FIGS. 3-10 is described in connection with wheel 32 (FIG. 1) and integrated tire electronics system 22 for simplicity. It should be understood however, that the following discussion applies equivalently to integrated tire electronics systems 24, 26, 28, and 62 (FIG. 1).

In general, power generation apparatus 72 is electrically interconnected with tire pressure sensor module 70 so as to provide electrical energy 78, labeled PWR, to tire pressure sensor module 70. Additionally, power generation module 72 may provide a wake-up signal 80, labeled WAKE, to tire pressure sensor module 70 in some embodiments. Tire pressure sensor module 70 may sense the tire's pressure, process the pressure signal, and subsequently transmit an output signal 82 via an antenna 84 to controller system 64. Controller system 64 includes a radio frequency (RF) receiver 86 having an antenna 88 for receiving the transmitted output signal 82 and communicating output signal 82 to an information processing circuit 90 for further processing. Display 68 is connected to an output of information processing circuit 90 and presents the information derived by information processing circuit 90 at instrument panel 66 (FIG. 1) of vehicle 20 (FIG. 1).

In accordance with a particular embodiment, power generation apparatus 72 includes power conditioning circuit 74 located in housing 76, a flexible arm 92, and a power generating element 94. Flexible arm 92 and power generating element 94 are located external to housing 76. Power generating element 94 is coupled to flexible arm 92 and is configured to generate electrical energy 78. More particularly, flexible arm 92 has a first end 96 and a second end 98. First end 96 is coupled to housing 76 of integrated tire electronics system 22 via, for example, soldering, an edge connector, fasteners, and the like. Through its connection to housing 76, first end 96 of flexible arm 92 is thereby coupled to rim 40 (FIG. 1) of wheel 32 (FIG. 1).

Second end 98 of flexible arm 92 is configured to be in contact with an inside tread surface 100 of tire 48. However, second end 98 is mechanically uncoupled from inside tread surface 100. That is, there are no fasteners, adhesives, and the like that physically connect second end 98 of flexible arm 92 to inside tread surface 100. Since there is no physical connection of flexible arm 92 to inside tread surface 100 of tire 48, power generation apparatus 72 is fully decoupled from tire 48. Accordingly, when tire 48 needs to be replaced, integrated tire electronics system 22 including flexible arm 92 will remain mounted to rim 40 and need not be concurrently replaced.

In some embodiments, second end 98 includes a hook feature 99 or some other structure to facilitate a sliding motion of second end 98 relative to inside tread surface 100. For example, flexible arm 92 may be premolded or otherwise shaped to include hook feature 99. The upturn of hook feature 99 largely prevents second end 98 of flexible arm 92 from adhering to or otherwise damaging inside tread surface 100. Those skilled in the art will recognize that second end 98 may have any suitable shape that facilitates of sliding motion of second end 98 relative to inside tread surface 100.

Figure 3:
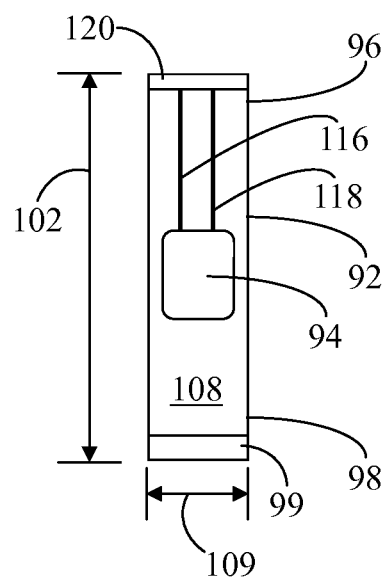
FIG. 3 shows a front view of flexible arm of the power generation apparatus.
Figure 6:
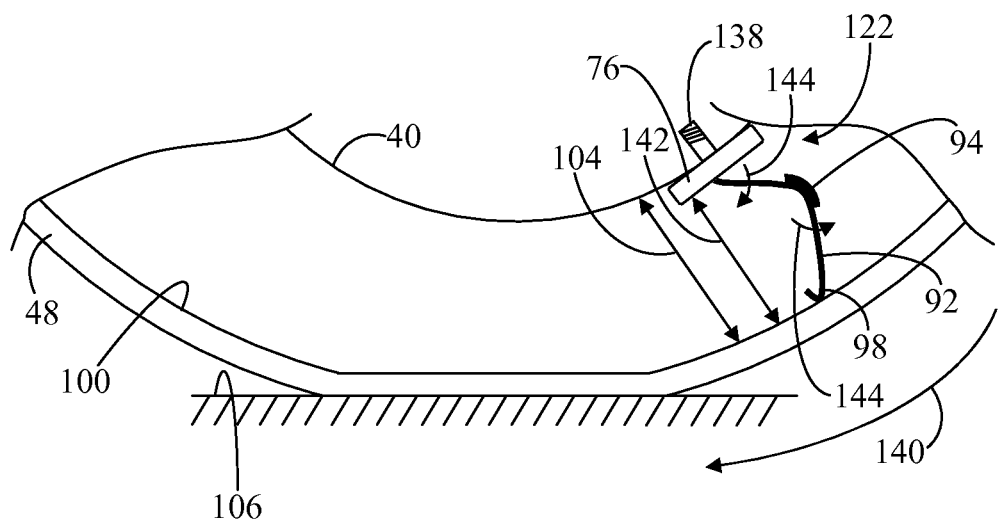
FIG. 6 shows a partial cross sectional view of a tire in which the integrated tire electronics module is located.

Referring together to FIGS. 2 and 3, FIG. 3 shows a front view of flexible arm 92 of power generation apparatus 72. In an embodiment, flexible arm 92 exhibits a total length 102 that is at least equivalent to the greatest magnitude of a distance between rim 40 and inside tread surface 100 of tire 48. Referring briefly to FIG. 6, a maximum distance 104 is at a location inside tire 48 when tire 48 is not in contact with a surface 106, such as a road, and tire 48 is fully inflated.

With reference back to FIGS. 2 and 3, flexible arm 92 is formed from a material that is appropriately stiff, but is elastically deformable. That is, flexible arm 92 is formed from a material that capable of flexing or bending when force is applied. However, this deformation is reversible. As such, once the forces that cause the flexing are no longer applied, flexible arm 92 returns to its original shape. Such materials include, but are not limited to elastomers, shape memory metals, rubber, and the like.

In some embodiments, flexible arm 92 includes a surface 108 having a first dimension 109, e.g., width (see FIG. 3), that is greater than a second dimension 110, e.g., thickness (see FIG. 2) of flexible arm 92. The configuration of flexible arm 92 enables the deformation of flexible arm 92 in a direction 112 that is approximately transverse to flat surface 108 of flexible arm 92. Power generating element 94 is coupled to surface 108 of flexible arm 92. More particularly, power generating element 94 is coupled to flexible arm 92 at a location 114 of a greatest degree of flexure relative to a remainder of flexure in flexible arm 92. Although flexible arm 92 is describe having a width 109 that is significantly greater than its thickness 110, in alternative embodiments, flexible arm 92 may be a "whisker" configuration with a low width to thickness ratio. Such a "whisker" configuration may serve to make it easier to remove the tire since it would be compliant to side loads.

In operation, when wheel 32 rotates (i.e., rolls), the portion of tire 48 that is instantaneously in contact with the surface of road 106 will momentarily compress such that a distance between rim 40 and inside tread surface 100 of tire 48 decreases relative to maximum distance 104 (FIG. 6). The contact location between tire 48 and surface 106 is sometimes referred to as a contact patch. As tire 48 continues to roll, this location will move out of contact with surface 106, i.e. the contact patch terminates. Hence, the distance between rim 40 and inside tread surface 100 of tire 48 will increase to, for example, maximum distance 104. Flexible arm 92 having second end 98 in contact with inside tread surface 100 deforms, i.e., flexes, in response to this variability of distance between rim 40 and tire 48 during this rolling movement of tire 48. That is, as wheel 32 rotates, flexible arm 92 will flex in response to the force imposed from contact with surface 106 and then reverse its flexure when this force is removed due to the elastic deformation characteristics of flexible arm 92.

In an embodiment, power generating element 94 may be a piezoelectric strip material, such as thin film lead zirconium titanate (PZT), quartz, lithium niobate, or another piezoelectric material, that is capable of converting mechanical strain resulting from deformation of flexible arm 92 to electrical energy 78. That is, a piezoelectric material generally includes a crystalline or polycrystalline material that generates charge when subjected to mechanical strain. Thus, the piezoelectric power generating element 94 is capable of harvesting energy from the motion (i.e., deformation) of flexible arm 92 by the piezoelectric effect. A typical piezoelectric strip material can produce power on the order of milliwatts which may be more than sufficient for powering the electronic circuits within integrated tire electronics system 22. By positioning power generating element 94 at location 114 having the greatest degree of flexure (i.e., the greatest mechanical strain) relative to the rest of flexible arm 92, the greatest amount of energy may be harvested from the motion of flexible arm 92.

As shown in FIG. 3, one or more conductive traces 116, 118 may be formed in flexible arm 92. For example, flexible arm 92 may be configured as a flat flexible circuit having multiple inner layers, in which at least one of the layers includes conductive traces 116, 118. In this example, conductive traces 116, 118 may be coupled with pins within an edge connector 120 located at first end 96 of flexible arm 92. Thus, edge connector 120 may be connected with a corresponding receptacle (not shown) in housing 76 so as to electrically interconnect piezoelectric material with power conditioning circuitry 74 of power generation apparatus 72. Those skilled in the art will recognize that other structural configurations can be envisioned for carrying the harvested electrical energy 78 from piezoelectric power generating element 94 to power conditioning circuitry 74.

Figure 4:
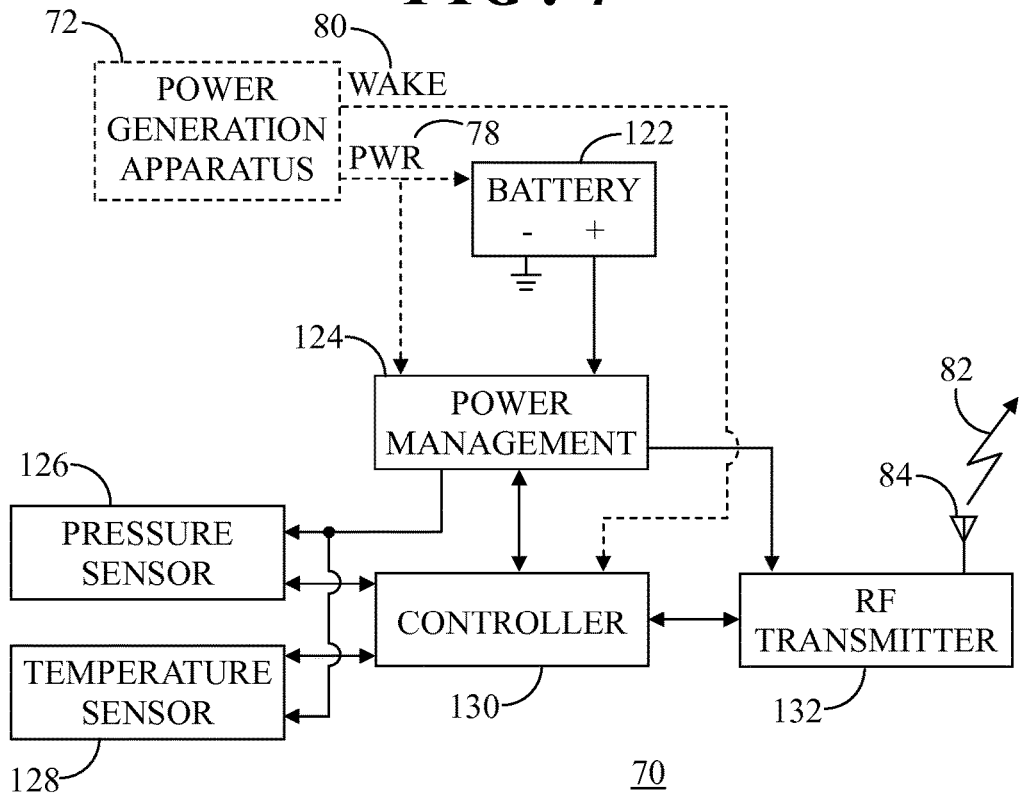
FIG. 4 shows a block diagram of the tire pressure sensor module.

FIG. 4 shows a simplified block diagram of tire pressure sensor module 70. Tire pressure sensor module 70 includes a battery 122 that may be connected to an input of a power management circuit 124. For example, the positive battery output is connected to an input of power management circuit 124. The negative battery output may be connected to a common return of all modules within integrated tire electronics system 22 (FIG. 2). Additionally, power generation apparatus 72 (shown in dashed line form) may be connected to another input of power management circuit 124 and/or to battery 122 (shown in dashed line form).

Electrical energy 78 from power generation apparatus 72 and electrical energy from battery 122 may be controlled by power management circuit 124 to separately power inputs of a pressure sensor 126, a temperature sensor 128, a process controller 130, and an RF transmitter 132 having antenna 84. In some embodiments, power management circuit 124 may prioritize the use of electrical energy 78 from power generation apparatus 72 over the use of electrical energy stored in battery 122. As such, battery 122 can be a small capacity battery. Alternatively, power generation apparatus 72 may generate sufficient electrical energy that battery 122 may not be needed. And in still other embodiments, battery 122 may be recharged from power generation apparatus 72.

In operation, pressure sensor 126 functions to sense tire pressure when pressure sensor 126 is powered. In one form, pressure sensor 126 may be a microelectromechanical systems (MEMS) pressure sensor suitable for positioning within tire 48. For example, a pressure sensor may be fabricated in silicon with the physical sensing mechanism being either a variable resistance or a variable capacitance. Similarly, when powered, temperature sensor 128 functions to sense the temperature of the air within tire 48. The temperature measurement may be done using variable capacitance, variable resistance, or a diode voltage.

Process controller 130 can function to perform an analog-to-digital conversion of the outputs of pressure sensor 128 and temperature sensor 128, provide clock synchronization and control signals to sensors 126, 128, provide reference voltages, and perform correction of sensor errors and non-linearity errors associated with the pressure and temperature measurements. Additionally, process controller 130 functions to gather pressure and temperature measurements at a given time interval and then send that data via RF transmitter 132 at another time interval. For example, process controller 130 may provide a low pressure alarm signal to RF transmitter 132 when the air pressure within tire 48 falls below a predetermined value.

In some configurations, process controller 130 may selectively connect and disconnect power from the other functional components of tire pressure sensor module 70 using power management circuit 124 as a matrix switch. In addition to functioning as a matrix switch, power management circuit 124 may have other power saving logic and functionality incorporated therein to implement various lower power modes and timing sense parameters. Those skilled in the art will readily recognize that tire pressure sensor module 70 can have more than or less than the functional modules depicted in FIG. 4, and can have more than or less than the functionality described herein.

Managing and controlling power consumption is a key task for low power applications. Some communication systems such as tire pressure sensor module 70 may switch from an active, ON, or motion mode to a standby, OFF, or park mode with reduced functionality and reduced power consumption. Furthermore, it may be desirable to monitor the tire pressure more often when the vehicle is being used as opposed to being motionless. Accordingly, tire pressure sensor modules are sometimes configured for at least two modes of operation, referred to herein as a motion mode and a park mode. In the motion mode, tire pressure sensor module 70 may take a tire pressure reading more frequently (for example, once every fifteen seconds) than when in the park mode (for example, once very ten minutes).

Accordingly, some tire pressure sensor modules include additional motion detection sensors and circuitry for identifying when the tire is in motion. Alternatively, some tire pressure sensor modules can contain logic circuitry or software code in a memory such as a ROM for the purpose of identifying when the tire is in motion based solely on the pressure and temperature measurements. Additional motion detection sensors and circuitry and/or logic circuitry or software code increases the complexity and commensurately the cost of such tire pressure sensor modules.

In accordance with an embodiment, when tire 48 (FIG. 2) begins to rotate and flexible arm 92 (FIG. 2) deforms in response to the rotation of tire 48, electrical energy 78 will begin to be generated. By way of example, a voltage can be generated based on the deformation rate of flexible arm 92 and/or based on the load across power generating element 94. The higher the deformation rate of flexible arm 92, the higher the generated voltage will be. Similarly, the smaller the load across power generating element 92 (i.e., the higher the resistance), the higher the generated voltage will be. In an embodiment, power conditioning circuit 74 can contain detection and conditioning circuitry that initially detects the voltage generated by power generating element 94 and communicates wake-up signal 80 to process controller 130 so that process controller 130 can direct switching from park mode to the sense mode. Conversely, when tire 48 stops rotating, the loss of wake-up signal 80 (optionally subject to certain timing considerations) can also be communicated to process controller so that process controller 130 can direct switch from sense mode to park mode. By using wake-up signal 80 from power generation apparatus 72, the incorporation of motion detection sensors and circuitry and/or logic circuitry or software code in tire pressure sensor module 70 may be negated, thereby potentially reducing cost and complexity of tire pressure sensor module 70.

Figure 5:
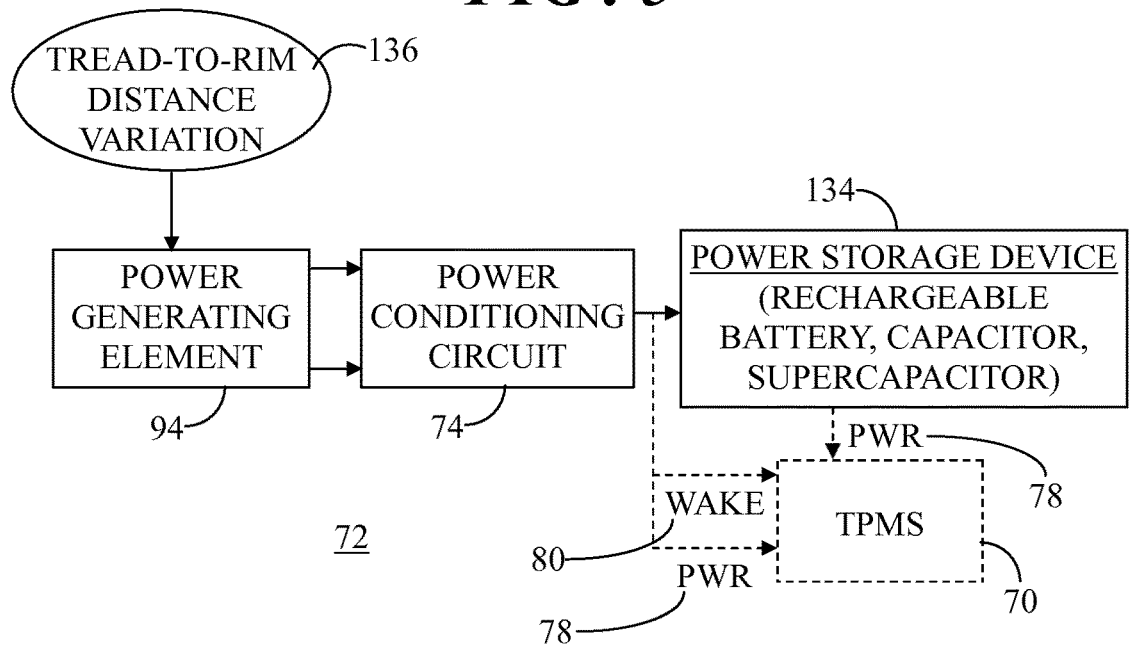
FIG. 5 shows a block diagram of the power generation apparatus.

FIG. 5 shows a simplified block diagram of power generation apparatus 72. In general, power generation apparatus 72 includes power generating element 94 in electrical communication with power conditioning circuit 74. Power generation apparatus 72 may further include a power storage device 134 electrically interconnected with power generating element 94 via power conditioning circuit 74. Additionally power storage device 134 may be electrically interconnected with tire pressure sensor module 70 (shown in dashed line form). Power storage device 134 may be a rechargeable battery, a capacitor, a supercapacitor, or some other device capable of storing electrical energy until it is needed.

In an embodiment, power generating element 94 generates power using a variability of distance between rim 40 (FIG. 1) and inside tread surface 100 (FIG. 2), represented herein by a tread-to-rim distance variation parameter 136. Power conditioning circuit 74 receives the power that was generated by energy harvesting from power generating element 94. Power conditioning circuit 74 converts the power to the appropriate voltage for electrical energy 78. Power conditioning circuit 74 may then provide electrical energy 78 to tire pressure sensor module 70. Alternatively, or additionally, power conditioning circuit 74 may provide all or a portion of electrical energy 78 to power storage device 134 where it may be stored until it is needed by tire pressure sensor module 70.

FIG. 6 shows a partial cross sectional view of tire 48 in which integrated tire electronics system 22 is located. As shown, housing 76 of integrated tire electronics system 22 is mounted to rim 40 at a valve stem 138 of tire 48. Tire 48 is in motion rolling along surface 106, as represented by an arrow 140. Second end 98 of flexible arm 92 is in contact with inside tread surface 100 of tire 48. However, the area of tire 48 at which flexible arm 92 is currently located is not in contact with surface 106. Thus, the elastically deformable flexible arm 92 extends to a distance 142 and may or may not stay in contact with inside tread surface 100. Arrows 144 represent the direction of flexure of flexible arm 92 that results in the extension of flexible arm 92 to distance 142 in this non-contact position.

Figure 7:
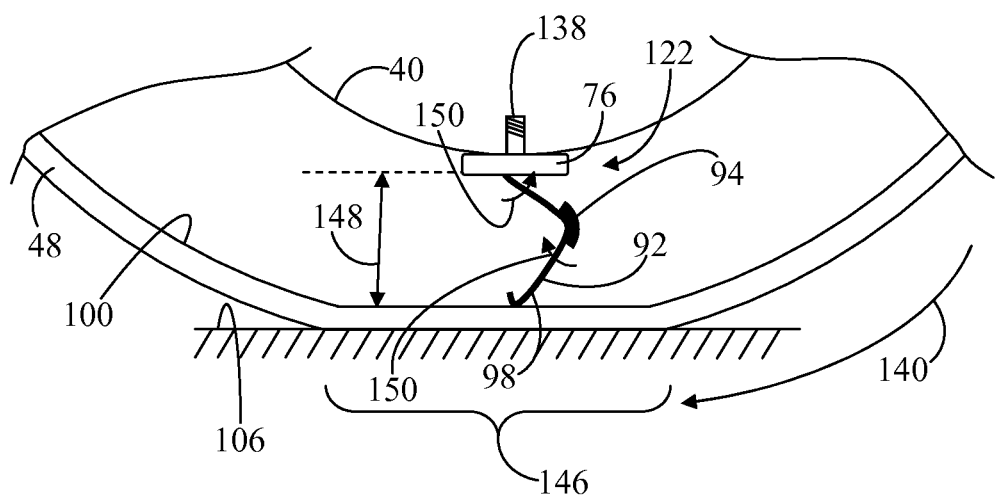
FIG. 7 shows a partial cross sectional view of the tire of FIG. 6 having rotated such that the integrated tire electronics system is located at a contact patch of the tire with a surface upon which it is rolling.

FIG. 7 shows a partial cross sectional view of tire 48 having rotated such that integrated tire electronics system 22 is now located at a contact patch 146 of tire 48 with surface 106 upon which it is rolling. FIG. 7 represents the condition in which the area of tire 48 at which flexible arm 92 is currently located is in contact with surface 106. Thus, elastically deformable flexible arm 92 compresses to a distance 148 that is less than distance 142 (FIG. 6). Arrows 150 represent the direction of flexure of flexible arm 92 that results in the compression of flexible arm 92 to distance 148 in this contact position.

Figure 8:
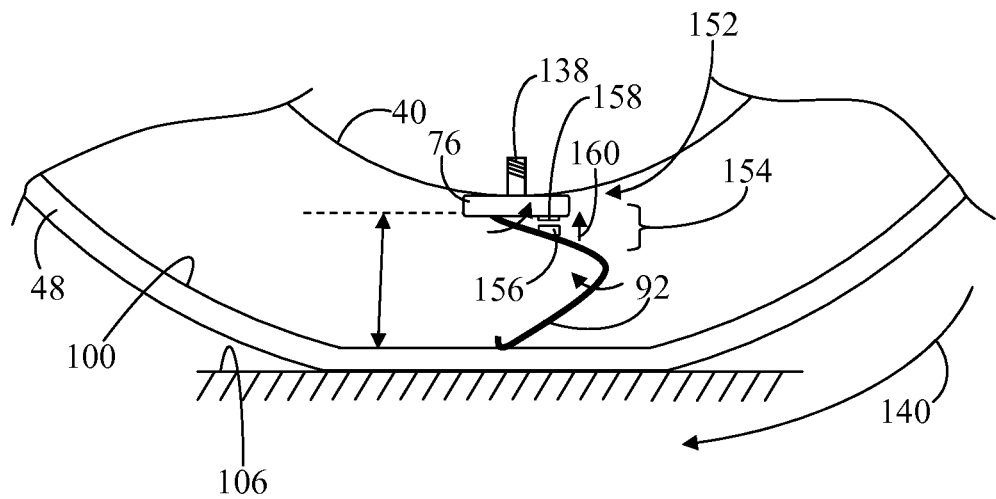
FIG. 8 shows a partial cross sectional view of a tire having an integrated tire electronics system in accordance with another embodiment.

FIG. 8 shows a partial cross sectional view of tire 48 having an integrated tire electronics system 152 in accordance with another embodiment. Integrated tire electronics system 152 is largely equivalent to integrated tire electronics system 22, discussed above. Thus, integrated tire electronics system 152 includes flexible arm 92, power conditioning circuitry 74 (not shown), and tire pressure sensor module 70 (not shown). A description of these components will not be repeated herein for brevity. However, integrated tire electronics system 152 implements an electromagnetic power generating apparatus 154 in lieu of the piezoelectric power generating element 94 (FIG. 2), discussed above.

Electromagnetic power generating apparatus 154 includes a magnet 156 coupled to flexible arm 92. Electromagnetic power generating apparatus 154 further includes a coil element 158 coupled to housing 76 or otherwise positioned within housing 76 so that it is in fixed relationship to rim 40. In accordance with this alternative embodiment, as flexible arm 92 deforms in response to the variability of distance between rim 40 and inside tread surface 100, electrical energy 78 (FIG. 2) is generated in coil element 158 in response to magnet 156 (which is coupled to flexible arm 92) moving relative to coil element 158. The movement of magnet 156 relative to coil element 158 is represented by an arrow 160. That is, voltage is induced in coil element 158 by keeping coil element stationary 158 and moving the magnetic field, i.e., moving magnet 156. This power is suitably conditioned at power conditioning circuitry 74 (FIG. 2) to produce electrical energy 78 (FIG. 2) for powering tire pressure sensor module 70 (FIG. 2).

Figure 9:
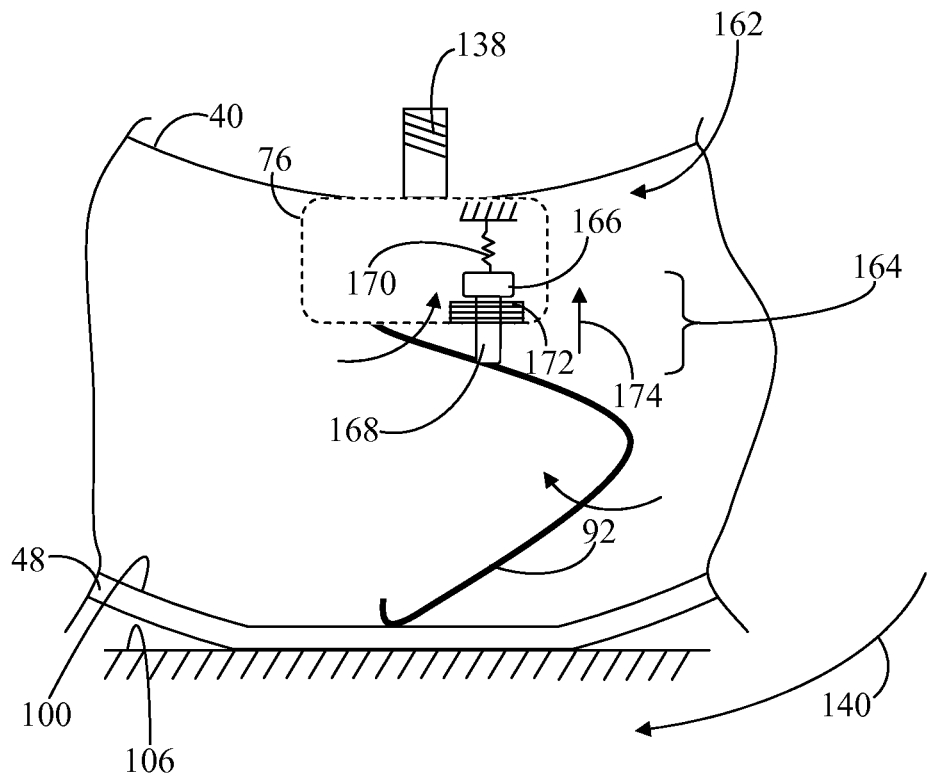
FIG. 9 shows a partial cross sectional view of a tire having an integrated tire electronics system in accordance with another embodiment.

FIG. 9 shows a partial cross sectional view of tire 48 having an integrated tire electronics system 162 in accordance with another embodiment. Integrated tire electronics system 162 is largely equivalent to integrated tire electronics system 22, discussed above. Thus, integrated tire electronics system 162 includes flexible arm 92, power conditioning circuitry 74 (not shown), and tire pressure sensor module 70 (not shown). Again, a description of these components will not be repeated herein for brevity. Like integrated tire electronics system 152 (FIG. 8), integrated tire electronics system 162 also implements an electromagnetic power generating configuration in lieu of the piezoelectric power generating element 94 (FIG. 2), discussed above.

Integrated tire electronics system 162 includes an electromagnetic power generating apparatus 164 that includes a magnet 166 coupled to a non-ferromagnetic shaft 168, which is in turn coupled to flexible arm 92. Magnet 166 is further coupled with a fixed spring element 170. Electromagnetic power generating apparatus 164 further includes a coil element 172 coupled to housing 76 or otherwise positioned within housing 76 so that it is in fixed relationship to rim 40. Housing 76 is shown in dashed line form to generally expose and emphasize the elements of electromagnetic power generating apparatus 164.

In accordance with this alternative embodiment, as flexible arm 92 deforms in response to the variability of distance between rim 40 and inside tread surface 100, electrical energy 78 (FIG. 2) is generated in coil element 172 in response to magnet 166 mounted to shaft 168 (which is coupled to flexible arm 92) moving relative to coil element 172. That is, voltage is induced in coil element 172 by keeping coil element 172 stationary and moving the magnetic field, i.e., moving magnet 166. The movement of magnet 166 relative to coil element 172 is represented by an arrow 174. This power is suitably conditioned at power conditioning circuitry 74 (FIG. 2) to produce electrical energy 78 (FIG. 2) for powering tire pressure sensor module 70 (FIG. 2).

Figure 10:
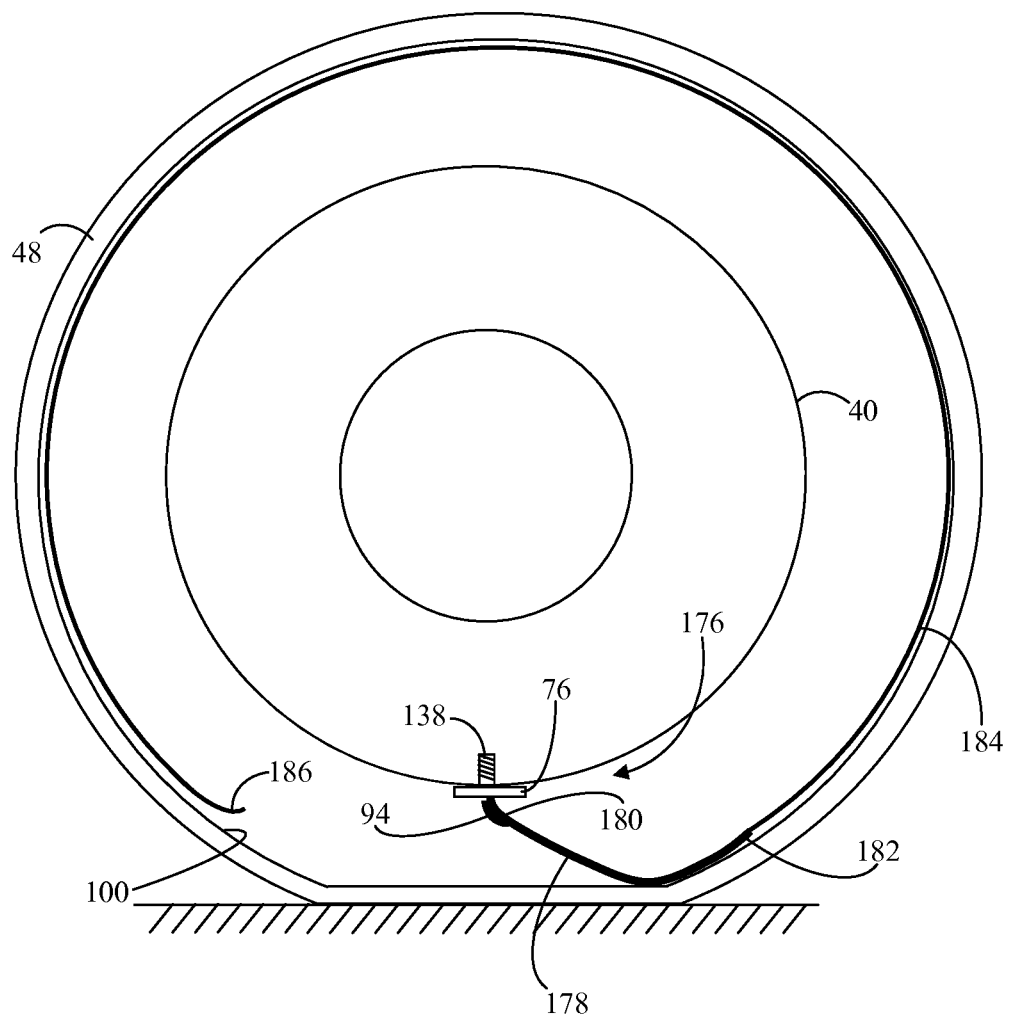
FIG. 10 shows a partial cross sectional view of a tire having an integrated tire electronics system in accordance with another embodiment.

FIG. 10 shows a partial cross sectional view of tire 48 having an integrated tire electronics system 176 in accordance with yet another embodiment. The components of integrated tire electronics system 176 are largely equivalent to the previously described systems, with the exception being that integrated tire electronics system 176 utilizes a flexible arm 178 in lieu of flexible arm 92, discussed above. In this exemplary configuration, piezoelectric power generating element 94 is coupled to flexible arm 178. Flexible arm 178 includes a first end 180 that is coupled to rim 40 via housing 76 and a second end 182 that is in contact with but mechanically uncoupled from inside tread surface 100. However, flexible arm 178 is different in shape from those described above. Accordingly, piezoelectric power generating element 94 is coupled to flexible arm 178 near first end 180 which is the location of greatest flexure relative to the remainder of flexible arm 178. Since power generating element 94 is coupled to first end 180 of flexible arm, it is positioned proximate housing 76 and valve stem 138. Thus, conductive traces (not shown) extending between housing 76 and power generating element 94 need not be as long as in the previously described structures.

Flexible arm 178 includes a highly flexible tail structure 184 extending from second end 182 of flexible arm 178. As discussed above, when tire 48 needs to be replaced, the integrated tire electronics system including flexible arm 92 will remain mounted to rim 40 and need not be concurrently replaced. In the embodiment of FIG. 10, tail structure 184 exhibits a length that corresponds with an outer circumference of rim 40. When a tire is being removed from rim 40, tail structure 184 will simply flex out of the way. Thereafter, flexible tail structure 184 can be wrapped around rim 40, and tip 186 may be optionally fastened to housing 76 via a latching mechanism (not shown) to hold flexible arm 178 in a raised position. The new tire can then be at least partially installed on rim 40 and the latching mechanism holding tip 184 of tail structure 184 can be released. For example, a button on valve stem 138 could release tip 184 of tail structure 184 and thereby allow flexible arm 178 to lower into contact with inside tread surface 100 of tire 48. As the tire begins to rotate, centrifugal force may cause tail structure 184 to move outwardly from rim 40 to contact, while remaining mechanically uncoupled from, inside tread surface 100.

Figure 11:
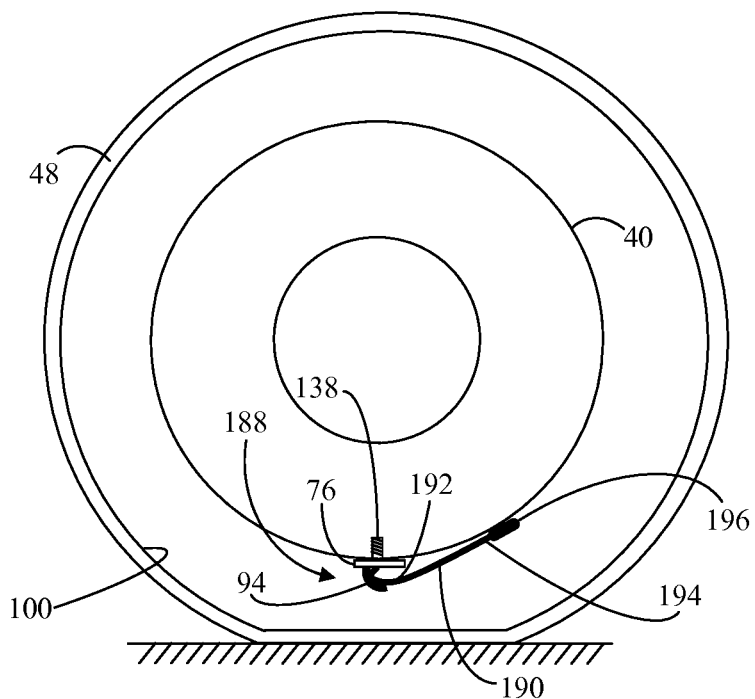
FIG. 11 shows a partial cross sectional view of a tire having an integrated tire electronics system in accordance with another embodiment.

FIG. 11 shows a partial cross sectional view of tire 48 having an integrated tire electronics system 188 in accordance with another embodiment. The components of integrated tire electronics system 188 are largely equivalent to the previously described systems, with the exception being that integrated tire electronics system 188 utilizes a flexible arm 190 in lieu of the flexible arms, discussed above. In this exemplary configuration, piezoelectric power generating element 94 is coupled to flexible arm 190 at a location of greatest flexure relative to the remainder of flexible arm 190. Flexible arm 190 includes a first end 192 that is coupled to rim 40 via housing 76 and a second end 194 that is in contact with but mechanically uncoupled from inside tread surface 100. In some embodiments, a mass element 196 may be coupled to second end 194 of flexible arm 190.

FIG. 11 represents a condition in which tire 48 is not in motion, i.e., it is not rotating, or is below some critical speed. Under such a condition, the spring force of flexible arm 190 will cause second end 194 of flexible arm 190 to be drawn toward rim 40. Thus, flexible arm 190 will not get in the way and be damaged or destroyed during tire installation and removal.

Figure 12:
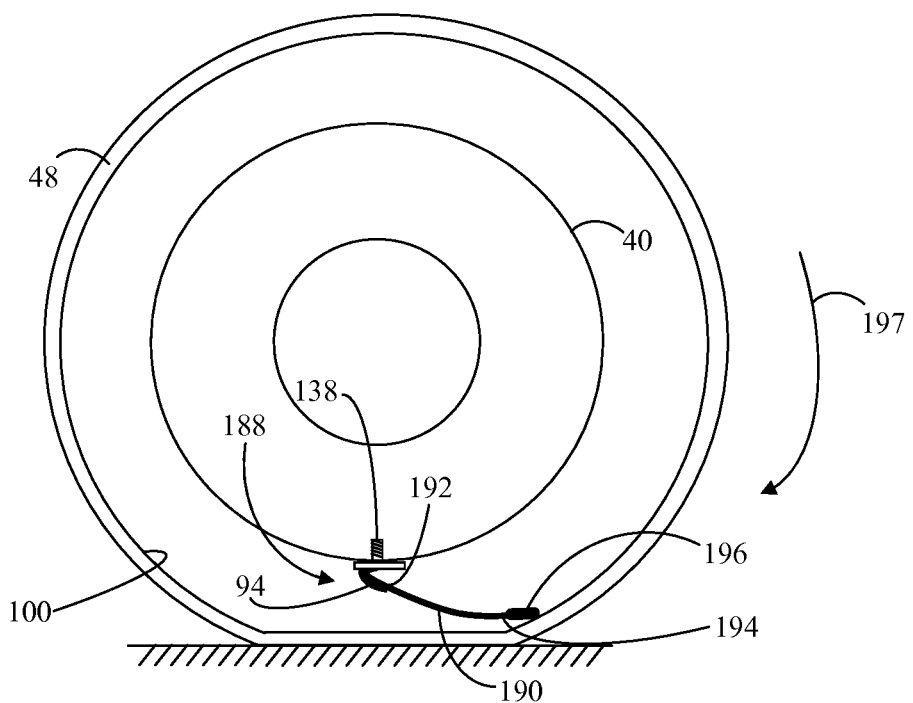
FIG. 12 shows a partial cross sectional view of a tire, having the integrated tire electronics system of FIG. 11, when the tire is in motion.

FIG. 12 shows a partial cross sectional view of tire 48, having integrated tire electronics system 188, when tire 48 is in motion, as represented by and arrow 197. As tire 48 rotates, the spring force of flexible arm 190 is less than the centrifugal force resulting from the rotational motion. Accordingly, second end 194 of flexible arm 190 will be drawn in contact with inside tread surface 100.

The various embodiments described above include a flexible arm in which one end is configured to be coupled to the rim upon which a tire is mounted and the opposing end is configured to be in contact with the inside tread surface of the tire. In alternative embodiments however, it may be possible for the flexible arm to have one end configured to be coupled to the inside tread surface of the tire, and the opposing end to be configured to be in contact with, but mechanically uncoupled from, the rim.

Figure 13:
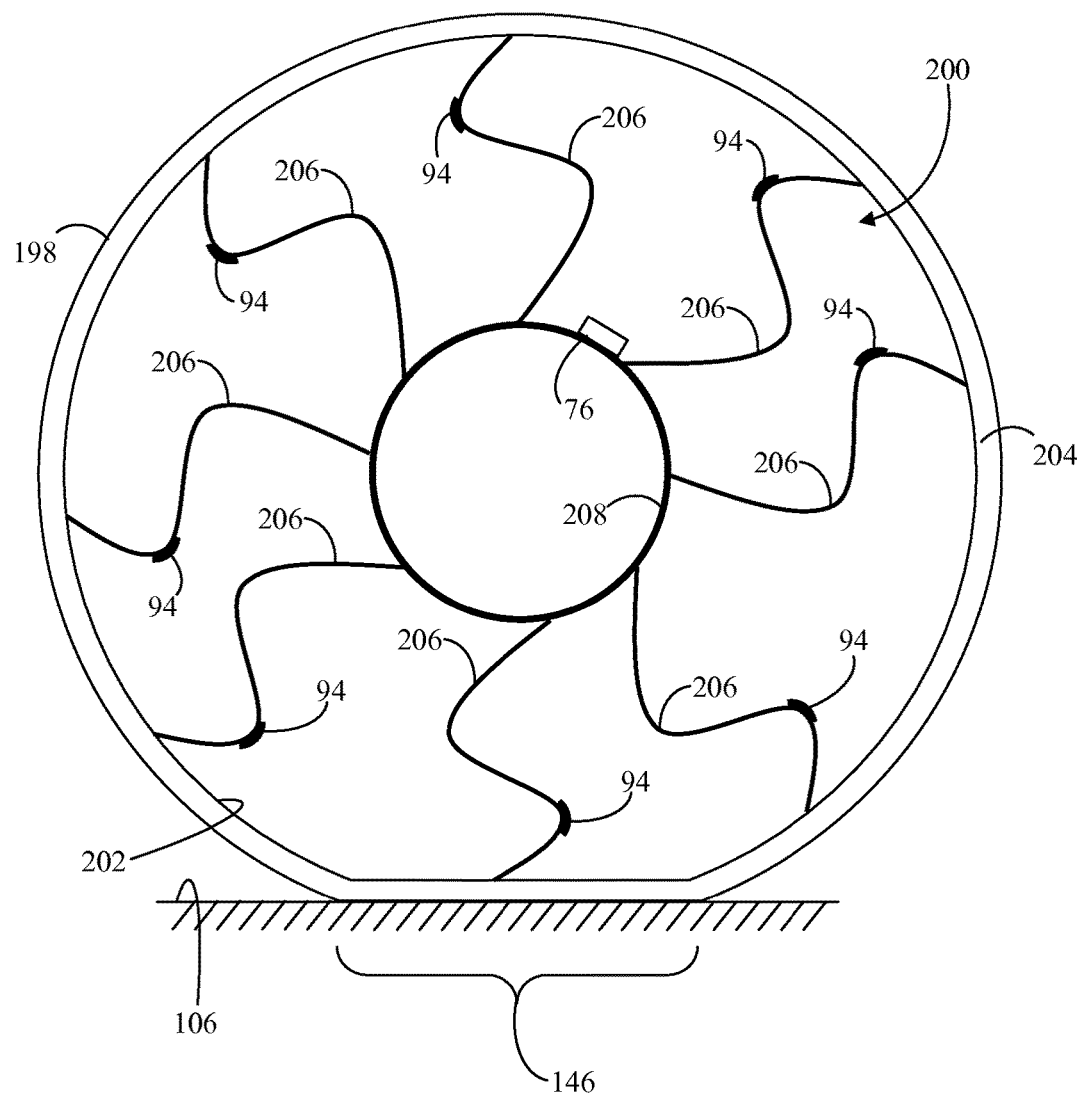
FIG. 13 shows a partial cross sectional view of a tire having an integrated tire electronics system in accordance with yet another embodiment.

Referring now to FIG. 13, FIG. 13 shows a partial cross sectional view of a tire 198 having an integrated tire electronics system 200 in accordance with yet another embodiment. In general, tire 198 is a non-pneumatic tire, or airless tire, that is not supported by air pressure. In the illustrated embodiment, a rim 202 serving as an inside tread surface of non-pneumatic tire 198 is most of the diameter of the wheel. Rim 202 can covered with a wearable rubber tread material 204. Flexible arms 206, in the form of semi-rigid arms or spokes, deform as each flexible arm 206 passes through contact patch 146 in order to soften the ride of the vehicle to which they are tire 198 is mounted. Power generating elements 94 are located at the compression area, i.e., the most flexible part, of each flexible arm 206. All power generating elements 94 can be wired to the power conditioning circuitry (not shown) within housing 76 of integrated electronics system 200 which can be mounted near a hub 208 to which tire 198 is mounted or, alternatively, on rim 202.

In summary, embodiments of the present invention, discussed above, entail a power generation apparatus, a system located inside a tire of a vehicle that includes the power generation apparatus, and a method for generating electrical energy within a tire of a vehicle. An embodiment of an apparatus for installation within a tire for a vehicle comprises a flexible arm having first and second ends. The first end is configured to be coupled to one of a rim upon which the tire is mounted and an inside tread surface of the tire. The second end is configured to be in contact with, but mechanically uncoupled from, the other of the rim and the inside tread surface. The apparatus further comprises a power generating element coupled to the flexible arm for generating electrical energy, wherein the flexible arm deforms in response to a variability of distance between the rim and the inside tread surface during rolling movement of the tire and the power generating element generates the electrical energy in response to deformation of the flexible arm.

An embodiment of a system for installation inside a tire of a vehicle comprises a tire pressure sensor module for monitoring an air pressure in the tire and a power generation apparatus. The power generation apparatus comprises a flexible arm having first and second ends. The first end is coupled to one of a rim upon which the tire is mounted and an inside tread surface of the tire. The second end is in contact with, but mechanically uncoupled from, the other of the rim and the inside tread surface. The power generation apparatus further comprises a power generating element coupled to the flexible arm for generating electrical energy. The power generating element is in electrical communication with the tire pressure sensor module, wherein the flexible arm deforms in response to a variability of distance between the rim and the inside tread surface during rolling movement of the tire, the power generating element generates the electrical energy in response to deformation of the flexible arm, and the power generating element provides the electrical energy to the tire pressure sensor module.

An embodiment of a method for generating electrical energy within a tire of a vehicle comprises coupling an apparatus to a rim upon which the tire is mounted. The apparatus includes a flexible arm and a power generating element coupled to the flexible arm. The flexible arm has first and second ends, wherein the coupling operation mechanically couples the first end of the flexible arm to the rim and the second end of the flexible arm is in contact with, but mechanically uncoupled from, an inside tread surface of the tire. The method further comprises rotating the tire on a surface, wherein the flexible arm deforms in response to a variability of distance between the rim and the inside tread surface during rolling movement of the tire and the power generating element generates the electrical energy in response to deformation of the flexible arm.

The power generation apparatus utilizes the variability of distance between the rim and an inside tread surface of the tire as the tire rotates to generate electrical energy. Furthermore, the flexible arm, upon which the power generating element resides and which may be mechanically uncoupled from the inside tread surface of the tire, enables the tire pressure sensor module to be mechanically decoupled from the service life of the tire, may allow for the elimination or minimization of the onboard battery for the tire pressure sensor module, and may indefinitely extend the lifetime of the tire pressure sensor module. Furthermore, the power generation apparatus may generate more electrical energy than required for current tire pressure sensor modules, thereby reducing the need for stringent low-power requirements in such devices. Additionally, the power generation apparatus may be utilized to switch from a sleep/park mode of operation to a motion/sense mode of operation, thereby reducing or eliminating the need for providing a motion detection sensor (e.g., accelerometer) within the tire pressure sensor module.

This disclosure is intended to explain how to fashion and use various embodiments in accordance with the invention rather than to limit the true, intended, and fair scope and spirit thereof The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus for installation within a tire for a vehicle comprising:
    a flexible arm having first and second ends, wherein said first end is configured to be coupled to one of a rim upon which said tire is mounted and an inside tread surface of said tire, and said second end is configured to be in contact with the other of said rim and said inside tread surface; and
    a power generating element coupled to said flexible arm for generating electrical energy, wherein said flexible arm deforms in response to a variability of distance between said rim and said inside tread surface during rolling movement of said tire and said power generating element generates said electrical energy in response to deformation of said flexible arm.

2. The apparatus of claim 1 wherein said flexible arm is mechanically uncoupled from said inside tread surface of said tire.

3. The apparatus of claim 1 wherein said flexible arm comprises a material that is elastically deformable.

4. The apparatus of claim 1 wherein said flexible arm exhibits a length that is at least equivalent to the greatest magnitude of said distance between said rim and said inside tread surface.

5. The apparatus of claim 1 wherein said flexible arm includes a generally flat surface having a first dimension that is greater than a second dimension of said flexible arm, said power generating element is attached to said flat surface and said flexible arm deforms in a direction that is approximately transverse to said flat surface.

6. The apparatus of claim 1 wherein said power generating element is coupled to said flexible arm at a location of a greatest degree of flexure relative to a remainder of said flexure in said flexible arm.

7. The apparatus of claim 1 wherein said power generating element comprises a piezoelectric material capable of converting mechanical strain resulting from said deformation of said flexible arm to said electrical energy.

8. The apparatus of claim 1 wherein said power generating element comprises:
    a magnet coupled to said flexible arm; and
    a coil element in fixed relationship to said one of said rim and said inside tread surface, said electric energy being generated in said coil element in response to said magnet moving relative to said coil element.

9. The apparatus of claim 1 wherein said power generating element is configured to be in electrical communication with a tire pressure sensor module located within said tire, said power generating element providing said electrical energy to said tire pressure sensor module.

10. The apparatus of claim 9 wherein said tire pressure sensor module enters a park mode when said tire is stationary, and provision of said electrical energy from said power generating element to said tire pressure sensor module causes said tire pressure sensor module to enter a motion mode from said park mode.

11. The apparatus of claim 1 further comprising a power storage device in electrical communication with said power generating element, wherein said power generating element provides said electrical energy to said power storage device.

12. The apparatus of claim 11 wherein said power storage device is configured to be in electrical communication with a tire pressure sensor module located within said tire, said power storage device providing said electrical energy to said tire pressure sensor module.

13. The apparatus of claim 11 wherein said power storage device comprises one of a rechargeable battery, a capacitor, and a supercapacitor.

14. A system for installation inside a tire of a vehicle comprising:
a tire pressure sensor module for monitoring an air pressure in said tire; and
a power generation apparatus comprising:
a flexible arm having first and second ends, said first end being coupled to one of a rim upon which said tire is mounted and an inside tread surface of said tire, said second end being in contact with the other of said rim and said inside tread surface; and
a power generating element coupled to said flexible arm for generating electrical energy, said power generating element being in electrical communication with said tire pressure sensor module, wherein said flexible arm deforms in response to a variability of distance between said rim and said inside tread surface during rolling movement of said tire, said power generating element generates said electrical energy in response to deformation of said flexible arm, and said power generating element provides said electrical energy to said tire pressure sensor module.

15. The system of claim 14 wherein said system is configured to be mounted on said rim, and said first end of said flexible arm is attached to a housing of said tire pressure sensor module, said first end of said flexible arm being coupled to said rim via its attachment to said housing.

16. The system of claim 14 wherein said tire pressure sensor module enters a park mode when said tire is stationary, and provision of said electrical energy from said power generating element to said tire pressure sensor module causes said tire pressure sensor module to enter a motion mode from said park mode.

17. The system of claim 14 further comprising a power storage device electrically interconnected between said power generating element and said tire pressure sensor module, wherein said power generating element provides at least a portion of said electrical energy to said power storage device.

18. A method for generating electrical energy within a tire of a vehicle comprising:
coupling an apparatus to a rim upon which said tire is mounted, said apparatus including a flexible arm and a power generating element coupled to said flexible arm, said flexible arm having first and second ends, wherein said coupling mechanically couples said first end of said flexible arm to said rim and said second end of said flexible arm is in contact with an inside tread surface of said tire; and
rotating said tire on a surface, wherein said flexible arm deforms in response to a variability of distance between said rim and said inside tread surface during rolling movement of said tire and said power generating element generates said electrical energy in response to deformation of said flexible arm.

19. The method of claim 18 further comprising providing at least a portion of said electrical energy to a tire pressure sensor module in electrical communication with said power generating element.

20. The method of claim 18 further comprising storing at least a portion of said electrical energy in a power storage device in electrical communication with said power generating element.

* * * * *